United States Patent
Dendy

(10) Patent No.: US 7,649,839 B2
(45) Date of Patent: Jan. 19, 2010

(54) METHOD AND DEVICE FOR MANAGING DATA RATE IN A COMMUNICATION SYSTEM

(75) Inventor: Roger P. Dendy, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 267 days.

(21) Appl. No.: 11/943,647

(22) Filed: Nov. 21, 2007

(65) Prior Publication Data

US 2009/0129276 A1 May 21, 2009

(51) Int. Cl.
*H04L 12/26* (2006.01)
(52) U.S. Cl. ..................................... 370/230
(58) Field of Classification Search ......... 370/229–232, 370/235, 236, 310, 328, 342, 464, 465, 468; 455/452, 455; 714/100, 746–755
See application file for complete search history.

(56) References Cited

U.S. PATENT DOCUMENTS

| 7,088,701 | B1 | 8/2006 | Attar |
| 7,369,549 | B2 * | 5/2008 | Wu et al. ................... 370/389 |
| 7,584,397 | B2 * | 9/2009 | Terry ........................ 714/748 |
| 2005/0276266 | A1 | 12/2005 | Terry |
| 2006/0014542 | A1 * | 1/2006 | Khandekar et al. .......... 455/447 |
| 2007/0168822 | A1 * | 7/2007 | Vitebsky et al. ............. 714/748 |
| 2007/0195740 | A1 | 8/2007 | Bhushan |
| 2007/0263740 | A1 * | 11/2007 | Kwon et al. ................. 375/260 |
| 2008/0148133 | A1 * | 6/2008 | Duggan ...................... 714/796 |
| 2008/0215948 | A1 * | 9/2008 | Pinheiro et al. ............. 714/748 |
| 2008/0240034 | A1 * | 10/2008 | Gollamudi .................. 370/330 |
| 2009/0034474 | A1 * | 2/2009 | Yavuz et al. ................ 370/331 |

FOREIGN PATENT DOCUMENTS

| WO | WO9923844 A2 | 5/1999 |
| WO | WO0042810 | 7/2000 |
| WO | WO0233856 A1 | 4/2002 |
| WO | WO2005055504 A1 | 6/2005 |

* cited by examiner

*Primary Examiner*—Dmitry H Levitan

(57) ABSTRACT

A method is provided for managing a data rate in a communication system that includes a first device. The first device receives (202) at least one data packet from a second device over a link, wherein the at least one data packet is sent at a first data rate, and monitors (204) a frequency of occurrence of early termination of transmissions on the link. The first device further determines (206) a second different data rate for the link based on the frequency of occurrence of early termination of transmissions and sends (208) a request to the second device to adjust the first data rate to the second data rate for subsequent transmission of data packets. Thereafter, the first device receives (210) at least one data packet from the second device over the link at the second data rate.

11 Claims, 4 Drawing Sheets

METHOD AND DEVICE FOR MANAGING DATA RATE IN A COMMUNICATION SYSTEM

TECHNICAL FIELD

The technical field relates generally to the field of communication systems, and more specifically, to a method and system for managing the data rate in a communication channel in a communication system.

BACKGROUND

In a communication system, an access device (also known and referred to in the art as an access terminal) communicates with other access devices through a Base Transceiver Station (BTS). Examples of access devices include, but are not limited to, a mobile phone, a Personal Digital Assistance (PDA), a laptop, etc. A BTS is infrastructure equipment that receives data from one access device and transmits it to one or more other access devices via communication links (also referred to herein as communication channels) with each of the access devices, thereby facilitating communication between them. Communication links/channels are the physical wireless communication resources over which information is sent between the BTS and each access device.

Devices in the system can measure or determine a signal quality indicator, such as a Carrier to Interference (C/I) ratio, of a communication channel such as a forward link (also commonly known as a downlink), which is the wireless communication resource over which a BTS sends information to the access device or a reverse link (also commonly known as an uplink), which is the wireless communication resource over which the access device sends information to the BTS. The signal quality indicator provides a measure of link or channel quality by indicating various channel conditions including, but not limited to, cross talk, carrier power, and the like. An amount of data and a data rate that can be supported by the communication channel depends on these channel conditions. After a maximum data rate of the communication channel is determined and requested, data packets are sent over the communication channel at the maximum data rate. However, the data transfer capacity of the communication channel can change with time and with changing channel conditions, or a device may desire to send more data. Hence, the maximum data rate of the communication channel should be revised accordingly.

More particularly, due to an increasing need for channel efficiency in communication systems, there exists a corresponding need for measuring relevant parameters to use in dynamically adjusting the data rate of a communication channel.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
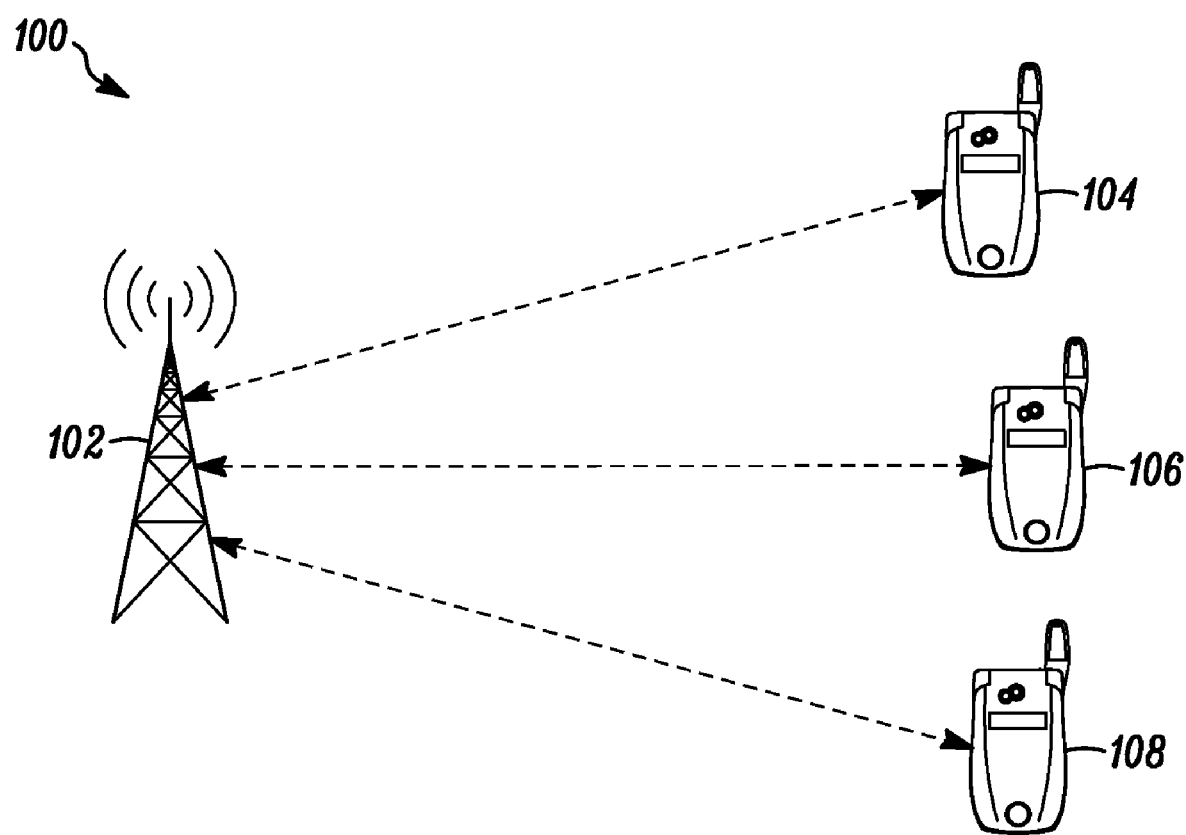
FIG. 1 illustrates a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a method and device for managing data rate in a communication system is provided. The communication system comprises a first device that includes a transceiver (i.e., transmitter and receiver apparatus) and a processing device operatively coupled together, which receives transmissions (at the receiver) over a link (e.g., over a forward link from a BTS or over a reverse link from an access device) and monitors (e.g., at the processing device) a frequency of occurrence of early termination of at least some of the transmissions. In this scenario, a second device transmits information/sends transmissions to the first device over the link at a first data rate. Each transmission comprises at least one data packet, which for purposes of this discussion describes in general a unit of information transmitted between the two devices. The processing device later determines a second different data rate for the link based on the frequency of occurrence of early termination of transmissions. Furthermore, the first device transmitter sends a data rate request (e.g., a data rate control (DRC) request) to the second device to adjust the first data rate to the second data rate for subsequent transmission of data packets.

Embodiments as described herein are used to update future data rate requests based on feedback in the form of early termination of transmission information, which indicates accuracy of previous data rate requests. This proactive updating of data rate requests provides improved bandwidth efficiency for the link. Those skilled in the art will realize that the above recognized advantages and other advantages described herein are merely illustrative and are not meant to be a complete rendering of all of the advantages of the various embodiments.

Referring now to the drawings and in particular to FIG. 1, a communication system 100 is shown and indicated generally in accordance with various embodiments of the teachings herein. The communication system 100 is a wireless communication system and includes a Base Transceiver Station (BTS) 102 and access devices 104, 106 and 108. For purposes of clarity, the communication system 100 is shown with a single BTS and three access devices. However, a typical communication system comprises additional such elements, which will be readily appreciated by one of ordinary skill in the art. Moreover, a commercial embodiment of system 100 will likely comprise additional elements not shown in FIG. 1. The access devices 104, 106, and 108 can communicate and interact with each other in the communication system 100 via the BTS 102.

As referred to herein, a BTS includes, but is not limited to, equipment commonly referred to as base stations, site controllers, access points, or any other type of interfacing device in a wireless environment. As referred to herein, an access device includes, but is not limited to, devices commonly referred to as access terminals (AT), user equipment (UE), mobile stations, mobile subscriber units, and any other device capable of operating in a wireless environment. Examples of these access devices include, but are not limited to, mobile phones, cellular phones, Personal Digital Assistants (PDAs), laptops and pagers. The access devices communicate with each other in the communication system 100 by using one or more communication channels over which data and other information are transmitted and received.

Examples of the communication system 100 include, but are not limited to, IEEE 802.16-based broadband wireless access networks (e.g., Worldwide Interoperability for Microwave Access (WiMAX) networks), Advanced Mobile Phone Systems (AMPS) networks, Global System for Mobile Communication (GSM) networks, Digital Cellular Systems (DCS) networks, Universal Mobile Telecommunications Systems (UMTS) networks, Code Divisional Multiple Access (CDMA) networks, CDMA Evolution-Data Optimized (CDMA EV-DO) networks, Ultra Mobile Broadband (UMB) networks, Long Term Evolution (LTE) networks, and the like. Those skilled in the art, however, will recognize and appreciate that the specifics of the illustrative examples set forth herein are not specifics of the invention itself and that the teachings set forth herein are applicable in a variety of alternative settings.

For example, since the teachings described do not depend on only the embodiments discussed, they can be applied to any type of access device operating in any type of network, although an access device operating in a CDMA EV-DO network is shown and described in illustrative embodiments. An example of a CDMA EV-DO network includes e.g., a 1xEV-DO network as standardized by $3^{rd}$ Generation Partnership Project 2 (3GPP2) as part of the CDMA 2000 family of standards, which include for instance, standards numerically designated as TIA (Telecommunications Industry Association)—856 Rev 0, TIA-856 Rev A, TIA-856 Rev B, TIA-1121, etc. As such, other alternative implementations are contemplated and are within the scope of the various teachings described.

In an embodiment, the BTS 102 facilitates communication with an access device, e.g., access device 104, by establishing a forward link with access device 104, wherein physical wireless communication resources are reserved or dedicated over which the communication between the BTS 102 and the access device 104 occurs, as is well known in the art. Once the forward link is established, the access device 104 periodically measures or estimates signal quality indicators for the forward link including, but not limited to, a carrier to interference (C/I) ratio, a signal to noise ratio (SNR), etc., which provide a measure of link or channel quality by indicating various channel conditions. Such channel conditions include, but are not limited to, cross talk, carrier power transmitted, interference level in the channel, and the like. The amount of data (as reflected by a data rate) that can be supported by the communication channel depends on these channel conditions. Hence, a data rate of the communication channel can be calculated by the access device 104 based on the signal quality indicators. The desired data rate is achieved through the combination of coding, bit repetition, and modulation, which are dynamically changed upon request of the access device. In the 1xEV-DO system, for example, the data rate varies between 153.3 kilobits per second, and 2457.6 kilobits per second, including a number of intermediate data rates.

For example, in 1xEV-DO networks, the data rate of transmission is reflected in what is known as a DRC value, which can be determined by the access device 104 using the measured C/I ratio for the forward link and by using other parameters, such as early termination of transmissions in accordance with embodiments described herein. In 1xEV-DO, for example, DRC 1 indicates 153.6 kbps and DRC 10 indicates 2.4576 Mbps. After the access device 104 determines the data rate for the forward link, the access device 104 sends a request to the BTS 102, which includes the DRC value and, thereby, an indication of a requested data rate (accordingly, the request is referred to in this embodiment as a DRC request). Upon receiving the DRC request having the DRC value, the BTS typically then transmits subsequent data packets over the forward link at the requested (e.g., first or current) data rate until the data rate is later changed, e.g., to a second different data rate as a result of a future DRC request received from the access device 104 based on a change in channel conditions over time. The DRC request is a message defined by the 1xEV-DO standard, transmitted by the access device over the DRC channel to the BTS 102.

In some communication systems, including 1xEV-DO systems, a data transmission on the forward link may end in a so called "early termination", which occurs as a result of an indication of a successful reception of a transmission (e.g., some form of acknowledgment (ACK)) before an estimated end time of the transmission, wherein the estimated end time was determined based on the first data rate. In accordance with embodiments herein, as described below in further detail, the access device 104 receives early termination of transmission feedback and uses this information and the current C/I ratio estimations for the communication channel to re-determine a new data rate for future transmission of data from BTS 102.

For example, in the standard 1xEV-DO implementation, the access device measures C/I of a pilot burst received on the forward link to make an estimate of channel conditions in its current location, fading environment, etc., and uses that estimate to inform the BTS, in the DRC request, of the highest data rate the channel can support based on this measurement. Data is transmitted at the requested rate in several sub-packets, and can be terminated early if the data is successfully received. Some error in the DRC estimate is usually inevitable. Errors may result from inaccuracy in the C/I estimate, pilot burst interference in excess of traffic slot interference, or temporal changes in the channel environment between the estimation and the traffic burst, for instance. However, the standard methodology does not include any mechanism for the access terminal to correct for errors in its estimate. On the contrary, embodiments described herein (for instance as illustrated by reference to FIGS. 2 and 3) provide for novel methods to use early termination of transmission information as feedback to improve the DRC estimates.

Figure 2:
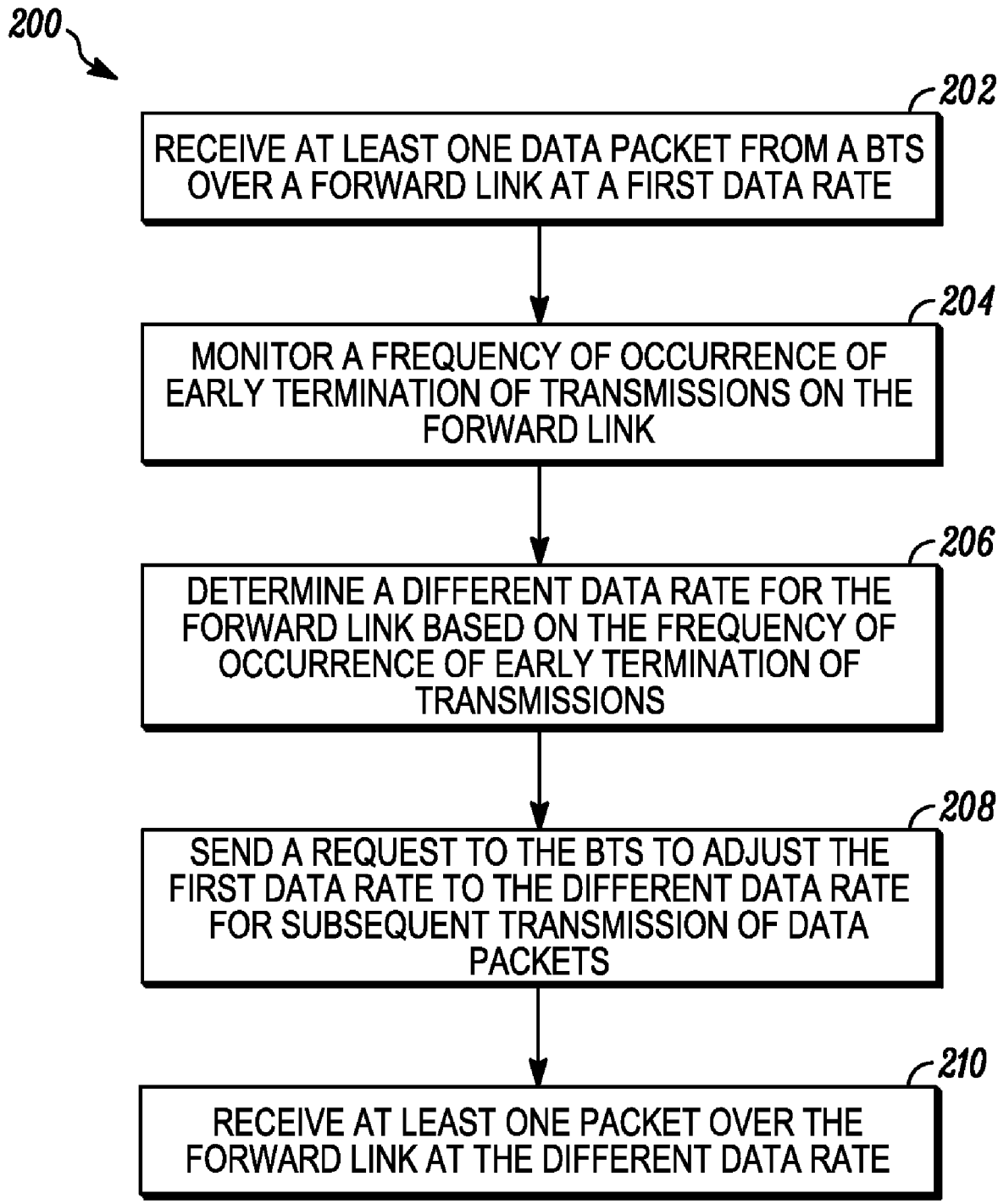
FIG. 2 is a flow diagram illustrating a method for managing data rate in a communication system, in accordance with some embodiments.

Turning now to the FIG. 2, a flow diagram 200 illustrating a method for managing data rate in a communication system is shown and generally indicated in accordance with various embodiments of the teachings herein. This method broadly outlines illustrative steps carried out in an access device for dynamically managing the data rate of a forward link. In accordance with method 200, the access device, in general: receives (202) at least one data packet from a BTS over a forward link, wherein the at least one packet is sent at a first data rate; monitors (204) frequency of occurrence of early termination of transmissions on the forward link; determines (206) a second different data rate for the forward link based on the frequency of occurrence of early termination of transmissions; sends (208) a request to the BTS to adjust the first data rate to the second data rate for subsequent transmission of data packets; and receives (210) at least one packet from the BTS over the forward link, wherein the at least one packet is sent at the second data rate.

Figure 3:
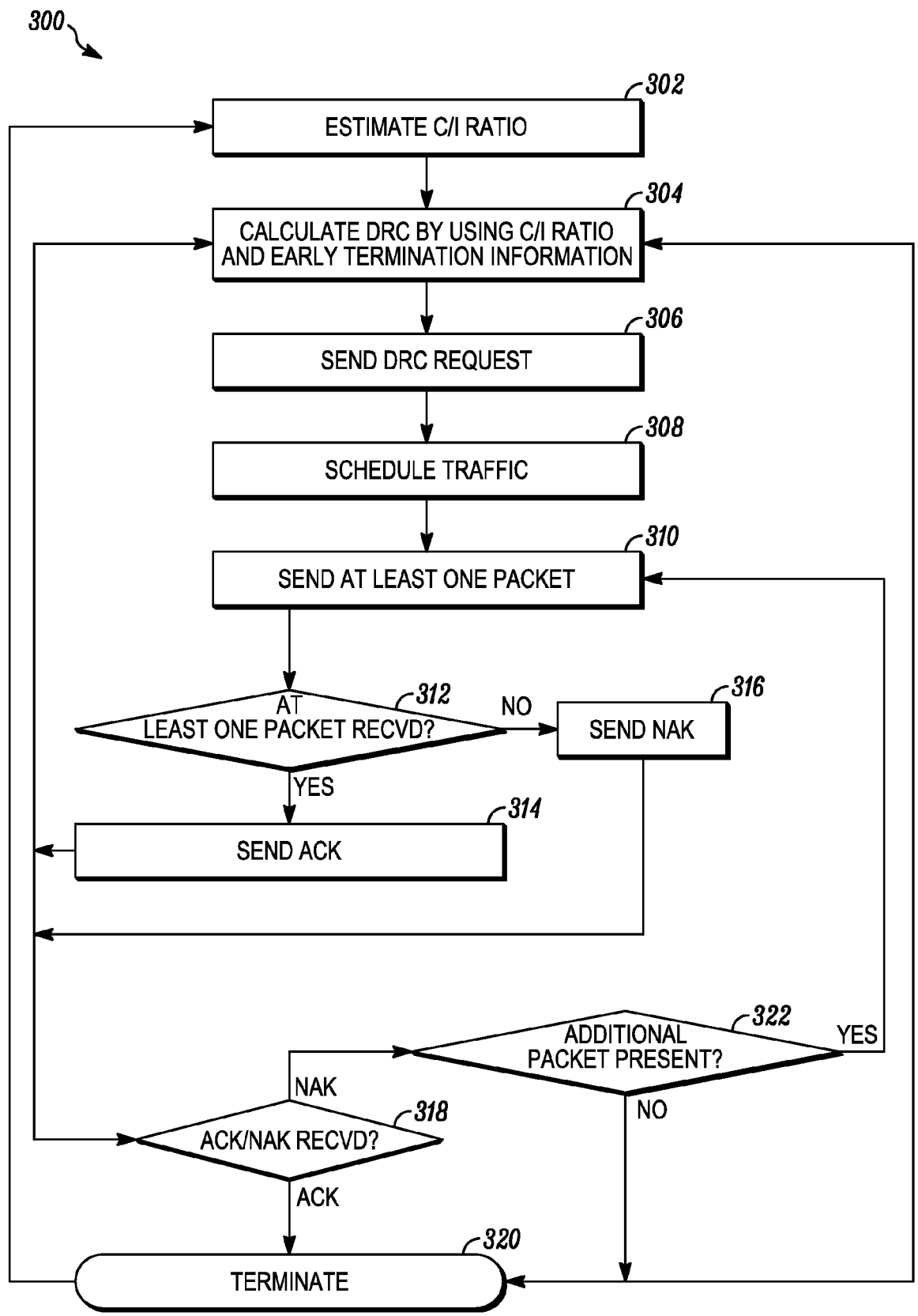
FIG. 3 is a flow diagram illustrating another method for managing data rate in a communication system, in accordance with some embodiments.

Details related to the performance of method 200 will next be explained with reference to both FIGS. 2 and 3. More particularly, at 202, the initial data rate at which data packets are transmitted from the BTS 102 to the access device 104 can be set a number of ways. For example, the access device, upon entering the coverage area of the BTS (or powering up within the coverage area of the BTS) and establishing a forward link with the BTS, may measure the channel conditions for the forward link (e.g., by measuring or estimating a signal quality indicator such as a C/I ratio or a signal to noise ratio). For purposes of the present illustration in a 1xEV-DO system, the access device estimates (302) a C/I ratio for the forward link and uses any suitable method or formula to calculate a maximum sustainable data rate for the forward link based on the channel conditions as corresponds to the estimated C/I ratio. In another embodiment, the BTS may initially set the data rate at which it sends packets to the access device over the forward link.

At 204, the access device 104 monitors a frequency of occurrence of early termination of transmissions for the forward link. Turning briefly to FIG. 3, the BTS schedules traffic (308) to send to the access device in the form of one or more data packets and begins to send (310) these data packets. The scheduling and sending of these data packets is constrained by the initial data rate that has been set. In one embodiment, the maximum number of packets for complete transmission, also known as the "termination target", can be associated with the data format for each data rate according to a standard, and known a priori to both the BTS 102 and the access device 104. In another embodiment, since the BTS 102 knows the data rate and performs the scheduling of the data packets, it may determine the termination target and communicate that number to the access device 104 at the start or during the data transmission, either as part of the data transmission or in a special message defined for the purpose. In yet another embodiment, since the BTS knows the data rate and knows the scheduling of the data packets, it can estimate a time to transmit all of the data packets and can signal any early termination of transmissions to the access device for a given packet transmission.

In one illustrative embodiment, ACK and NAK responses sent by the access device in response to the data packets sent by the BTS can be used as a basis for the BTS detecting and the access device monitoring the early termination of transmission on the forward link. For example, as discussed above, in 1xEV-DO networks the standard calls for the mobile access device to measure its received signal strength from the BTS using the pilot burst, and based on this measurement, to request the forward link data rate at which data packets are to be transmitted by the BTS. The BTS schedules (308) and sends (310) data to the access device at the requested rate in a sequence of several packets with brief spaces of several time slots between them. The transmitted packets also correspond to sub-packets, wherein: a first sub-packet corresponds to a packet being transmitted a first time; a second sub-packet includes data from the same packet being transmitted a second time; a third sub-packet includes data from the same packet being transmitted a third time; and so on. The sub-packets are interleaved and coded in such a way that, with adequate enough channel conditions, the access device might successfully extract the whole packet's information from any number of sub-packets.

Accordingly, depending on whether a packet/sub-packet was successfully received and decoded (312), the access device sends the BTS an appropriate response over a reverse channel. The response can be an ACK (314) indicating that the packet/sub-packet was received and successfully decoded by the access device, or it can be a NAK (316) indicating that the packet/sub-packet was not received or was received and not successfully decoded by the access device. If the BTS determines (318) that a NAK is sent, the BTS continues sending any remaining sub-packets (322, 310) until an ACK is sent or the BTS otherwise decides (322) to terminate transmission (320), for example if the retransmission attempts exceeds a preset value. Additional data packets are sent to compensate for the unsuccessful transmission of the original data packet. The additional packets can be duplicate copies of the original data packet or can contain portions of data therefrom. When an additional packet is present, the method is directed back to step 310, and the additional packet is transmitted from the BTS 102 to the access device 104. This continues until the additional data packets have all been successfully transmitted. On the other hand, when the additional data packets are not present at step 322, the method goes on to terminate at step 320.

If an ACK is sent, the BTS terminates (320) the packet transmission ('early termination'), and can schedule remaining timeslots for other users. This scheme is known as Hybrid Automatic Repeat Request (H-ARQ). In one illustrative example, initially the completion of transmission of data packets between the BTS 102 and the access device 104 was scheduled to occur over 4 sub-packets in 26.67 ms, but all the data packets were successfully transmitted in 2 sub-packets in 13.3 ms. This shows that the initial estimate was wrong and the DRC value now needs to be re-estimated in order to efficiently utilize the communication channel.

As can be seen, in accordance with the steps described above, there are three feedback loops in the method 300. After step 314, when the ACK is transmitted by the access device 104, feedback on the early termination of the transmission is sent to the DRC calculation at step 304. The feedback may contain information on the early termination or may indicate, for instance, that the estimated DRC value is conservative. The second feedback occurs when an NAK is received at step 318 and no additional data packets are present at step 322, e.g., such as when the number of retransmission attempts of the data packets has been exceeded. The feedback on the NAK and the additional data packets is used to adjust the DRC calculation at step 304. The second feedback loop terminates at step 304. The third feedback loop occurs upon termination of packet transmission at step 320, either early termination or after transmission of all packets, and returns to estimate the C/I ratio according to current conditions in the communication channel at step 302, in preparation for the next data packet transmission. The third feedback loop terminates at step 302.

Upon determining the early termination information, e.g., the occurrence of an early termination, the access device can store this information in any suitable storage medium to monitor the frequency of early termination of transmission for the forward link. At 206, the access device can, at one or more appropriate intervals, use the early-termination information to re-estimate (304) a data rate and corresponding DRC value for the transmission of subsequent data packets from the BTS 102 to the access device 104 over the forward link. Further, the DRC value can also be estimated (304), e.g., based on termination information received in the second feedback loop described above, and taken into account when determining the second data rate.

Completion of all sub-packets without successful reception indicates the requested data rate was higher than the channel could support. Conversely, an early termination is, in effect, an indication that the requested data rate is lower than the actual data rate that the channel could support. In accordance with the teachings herein, the access device can track the frequency of occurrence of early termination, and adjust the data rate and corresponding DRC value upward to compensate for pessimistic estimates. Various averaging, filtering, or windowing rules could be applied, singly or in combination, to determine the decision point at which the data rate is increased and a corresponding DRC request sent to the BTS in a given implementation. In one embodiment, the most recent N transmissions, where N is a configurable parameter, could be averaged together to determine whether the DRC request should be adjusted. In another embodiment, a number of transmissions could be averaged together, with additional weighting applied to the most recent transmissions. In some embodiments, values may be excluded from the average (that is, filtered), based on their variance from the trend of other values. By using early termination statistics to selectively increase DRC requests, greater throughput can be achieved.

Upon determining a second different data rate, at 208 the access terminal sends a DRC request (306) to the BTS including the DRC value as an indication to adjust the date rate for subsequent data packet transmissions. The BTS schedules (308) and transmits (310) subsequent packets to the access device over the forward link at the new data rate, some of which are received (310) at the access device so that early termination continues to be detected at the BTS and occurrence of early termination indicated to the access device for further adjustment of the data rate for the forward channel as needed, in accordance with the teachings herein.

Figure 4:
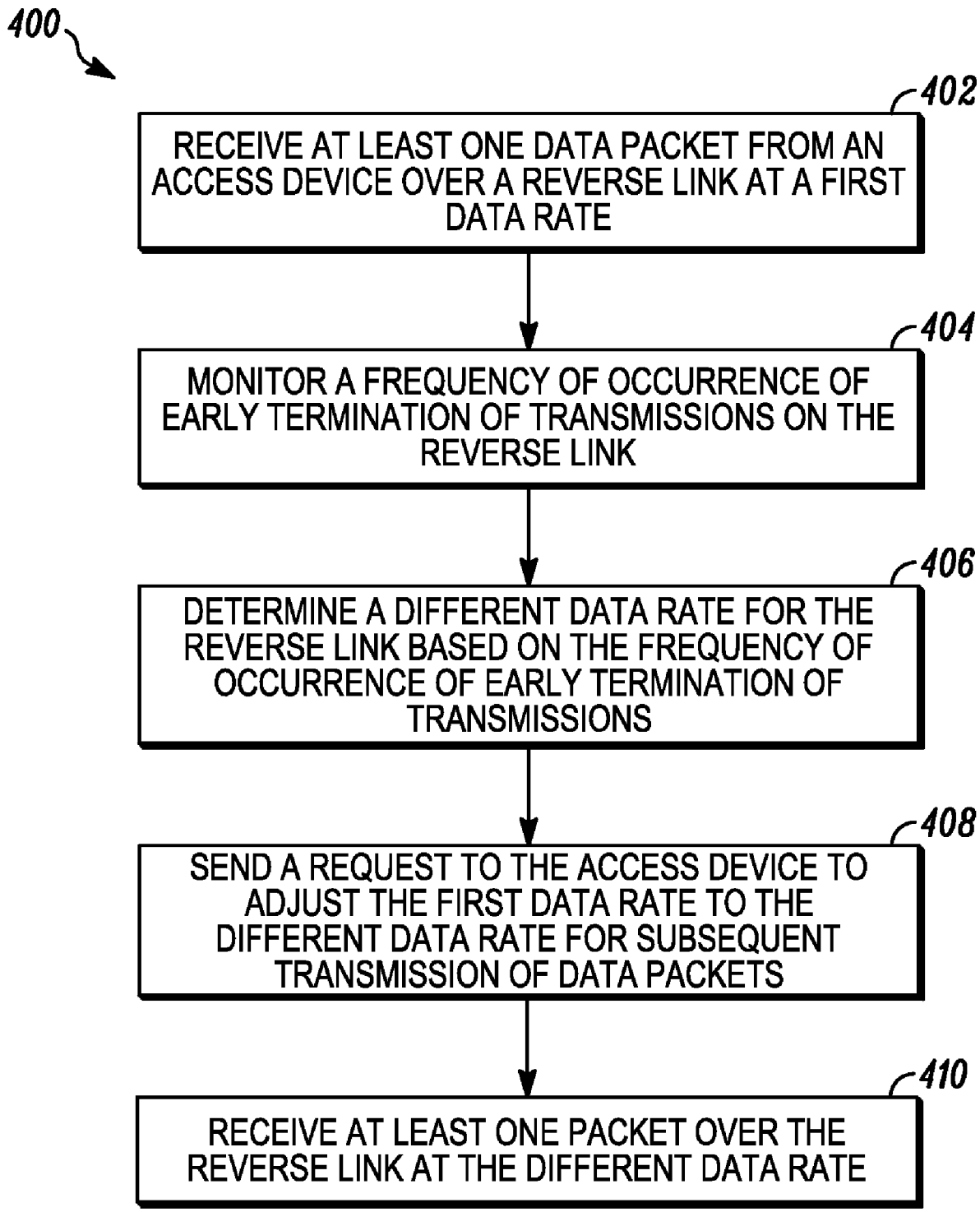
FIG. 4 is a flow diagram illustrating another method for managing data rate in a communication system, in accordance with some embodiments.

Turning now to the FIG. 4, a flow diagram 400 illustrating another method for managing data rate in a communication system is shown and generally indicated in accordance with various embodiments of the teachings herein. This method broadly outlines illustrative steps carried out in a BTS for dynamically managing the data rate on a reverse link from the access device to the BTS. In accordance with method 400, the BTS, in general: receives (402) at least one data packet from an access device over a reverse link, wherein the at least one packet is sent at a first data rate; monitors (404) frequency of occurrence of early termination of transmissions on the reverse link; determines (406) a second different data rate for the reverse link based on the frequency of occurrence of early termination of transmissions; sends (408) a request to the access device to adjust the first data rate to the second data rate for subsequent transmission of data packets; and receives (410) at least one packet from the access device over the reverse link, wherein the at least one packet is sent at the second data rate.

Details for implementing method 400 depend on the particular system 100 implementation, including, for example, the various protocols used therein. However, in an embodiment, the implementation details may be very similar to those with respect to method 200 illustrated in FIG. 2. Therefore, details related to the performance of method 400 will next be briefly explained with reference to FIGS. 3 and 4, as an illustrative implementation. More particularly, at 402, the initial data rate at which data packets are transmitted from the access device to the BTS can be set a number of ways, including based on a measurement of the channel conditions for the reverse link using any suitable means including those described above.

At 404, the BTS 102 monitors a frequency of occurrence of early termination of transmissions for the reverse link. Turning to FIG. 3, the access device schedules traffic (308) to send to the BTS in the form of one or more data packets and begins to send (310) these data packets. The scheduling and sending of these data packets is constrained by the initial data rate that has been set. Similar to the description of FIG. 2, in the reverse link as well, an ACK or a NAK response from the BTS can be used as a basis for the BTS detecting and monitoring the early termination of transmission on the reverse link.

Accordingly, depending on whether a packet/sub-packet was successfully received and decoded (312), the BTS sends the access device an appropriate response over a forward channel. The response can be an ACK (314) indicating that the packet/sub-packet was received and successfully decoded by the BTS, or it can be a NAK (316) indicating that the packet/sub-packet was not received or was received and not successfully decoded by the BTS. If the access device determines (318) that a NAK is sent, the access device continues to send any remaining sub-packets (322, 310) until an ACK is sent or the access device otherwise decides (322) to terminate transmission (320), for example if the retransmission attempts exceeds a preset value.

When additional packets are present, the method is directed back to step 310, and an additional packet is transmitted from the access device 104 to the BTS 102. This continues until the additional data packets have all been successfully transmitted. On the other hand, when additional data packets are not present at 322, the method goes on to terminate at 320. If an ACK is sent, the access device terminates (320) the packet transmission ('early termination'), and remaining timeslots can be scheduled for other users.

Upon determining the early termination information, e.g., the occurrence of an early termination, the BTS can store this information in any suitable storage medium to monitor the frequency of early termination of transmission for the reverse link. At 406, the BTS can, at one or more appropriate intervals use the early-termination information to re-estimate (304) a data rate for the transmission of subsequent data packets from the access device 104 to the BTS 102 over the reverse link. Upon determining a second different data rate, at 408 the BTS sends a data rate request to the access device to adjust the date rate for subsequent data packet transmissions. The access device schedules (308) and transmits (310) subsequent packets to the BTS over the reverse link at the new data rate, some of which are received (310) at the BTS so that early termination continues to be detected and occurrence of early termination monitored for further adjustment of the data rate for the reverse link as needed, in accordance with the teachings herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises ... a", "has ... a", "includes ... a", "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for managing data rate in a communication system described herein. The non-processor circuits may include, but are not limited to, a radio receiver, a radio transmitter, signal drivers, clock circuits, power source circuits, and user input devices. As such, these functions may be interpreted as steps of a method to perform the managing of data rate in a communication system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for managing data rate in a communication system, the method comprising:
    at an access device:
        receiving at least one data packet from a base transceiver station (BTS) over a forward link, wherein the at least one data packet is sent at a first data rate;
        monitoring a frequency of occurrence of early termination of transmissions on the forward link;
        determining a second different data rate for the forward link based on the frequency of occurrence of early termination of transmissions;
        sending a request to the BTS to adjust the first data rate to the second data rate for subsequent transmission of data packets.

2. The method as recited in claim 1, wherein the data rate is calculated based on a signal quality indicator for the forward link.

3. The method as recited in claim 2, wherein the signal quality indicator comprises one of a carrier to interference (C/I) ratio or a signal to noise ratio (SNR).

4. The method as recited in claim 1 further comprising receiving at least one data packet from the BTS over the forward link, wherein the at least one data packet is sent at the second data rate.

5. The method as recited in claim 1, wherein the second data rate is higher than the first data rate.

6. The method as recited in claim 1, wherein at least one of an averaging, filtering or windowing method is used to determine a time at which to determine and request the second data rate.

7. The method as recited in claim 1, wherein transmission of acknowledgement (ACK) and non-acknowledgement (NAK) responses by the access device to the BTS are used to monitor the frequency of occurrence of early termination of transmissions.

8. A device for managing data rate in a communication system, the device comprising:
    a transceiver and a processing device operatively coupled and:
        receiving at least one data packet from a base transceiver station (BTS) over a forward link, wherein the at least one data packet is sent at a first data rate;
        monitoring a frequency of occurrence of early termination of transmissions on the forward link;
        determining a second different data rate for the forward link based on the frequency of occurrence of early termination of transmissions;

sending a request to the BTS to adjust the first data rate to the second data rate for subsequent transmission of data packets.

9. The device as recited in claim 8, wherein the device is an access device operating in a Broadband Evolution Data (EV-DO) Network.

10. A method for managing data rate in a communication system, the method comprising:

at base transceiver station:

receiving at least one data packet from an access device over a reverse link, wherein the at least one data packet is sent at a first data rate;

monitoring a frequency of occurrence of early termination of transmissions on the reverse link;

determining a second different data rate for the reverse link based on the frequency of occurrence of early termination of transmissions;

sending a request to the access device to adjust the first data rate to the second data rate for subsequent transmission of data packets.

11. The method as recited in claim 10 further comprising receiving at least one data packet from the access device over the reverse link, wherein the at least one data packet is sent at the second data rate.

* * * * *